(12) United States Patent
Zhang et al.

(10) Patent No.: US 11,430,308 B1
(45) Date of Patent: Aug. 30, 2022

(54) MULTI-MOTION GENERATOR

(71) Applicant: Apple Inc., Cupertino, CA (US)

(72) Inventors: Jian Zhang, Cupertino, CA (US); Siva Chandra Mouli Sivapurapu, Santa Clara, CA (US); Aashi Manglik, Sunnyvale, CA (US); Amritpal Singh Saini, San Jose, CA (US); Edward S. Ahn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/242,856

(22) Filed: Apr. 28, 2021

Related U.S. Application Data

(60) Provisional application No. 63/030,090, filed on May 26, 2020.

(51) Int. Cl.
*H04B 3/36* (2006.01)
*G08B 6/00* (2006.01)

(52) U.S. Cl.
CPC ..................... *G08B 6/00* (2013.01)

(58) Field of Classification Search
CPC .. H04B 3/36; G06K 9/00342; G06K 9/00369; G06K 9/32; G06K 9/00362; G06K 9/00; G06T 7/0046; G06T 7/75; G06T 7/2046
See application file for complete search history.

(56) References Cited

U.S. PATENT DOCUMENTS

| 8,755,569 | B2 * | 6/2014 | Shen | G06V 40/20 |
| | | | | 382/107 |
| 9,098,766 | B2 * | 8/2015 | Dariush | G06V 10/24 |
| 9,697,609 | B2 * | 7/2017 | Kim | G06V 40/103 |

* cited by examiner

*Primary Examiner* — Toan N Pham
(74) *Attorney, Agent, or Firm* — Fernando & Partners, LLP

(57) ABSTRACT

A method includes obtaining, by a motion generator that has been trained to generate torque values for a plurality of joints of a rig associated with a target, a set of parameters associated with a target motion. The method includes, in response to the target motion being a first type of motion, generating a first set of torque values for the plurality of joints based on the set of parameters and a set of previous poses of the target. The method includes, in response to the target motion being a second type of motion, generating a second set of torque values for the plurality of joints based on the set of parameters and the set of previous poses of the target. The method includes triggering a movement of the target in accordance with the first set of torque values or the second set of torque values.

20 Claims, 10 Drawing Sheets

MULTI-MOTION GENERATOR

CROSS-REFERENCE TO RELATED APPLICATION

This application claims the benefit of U.S. Provisional Patent App. No. 63/030,090, filed on May 26, 2020, which is incorporated by reference in its entirety.

TECHNICAL FIELD

The present disclosure generally relates to a multi-motion generator.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
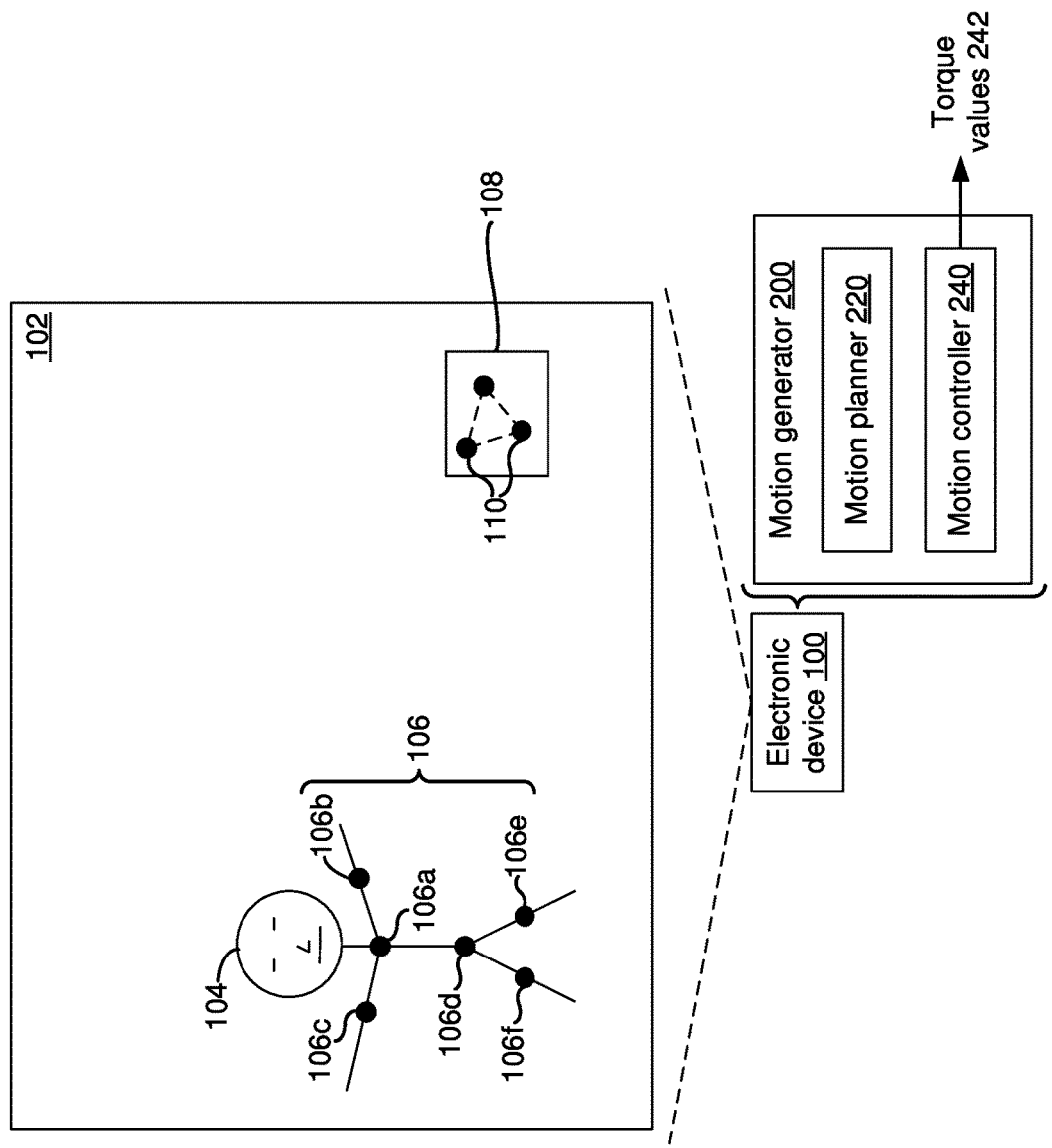
FIGS. 1A-1B are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating motion. In various implementations, a device includes a non-transitory memory and one or more processors coupled with the non-transitory memory. In some implementations, a method includes obtaining, by a motion generator that has been trained to generate torque values for a plurality of joints of a rig associated with a target, a set of parameters associated with a target motion for the target. In some implementations, the method includes, in response to the target motion being a first type of motion, generating, by the motion generator, a first set of torque values for the plurality of joints based on the set of parameters and a set of previous poses of the target. In some implementations, the method includes, in response to the target motion being a second type of motion that is different from the first type of motion, generating, by the motion generator, a second set of torque values for the plurality of joints based on the set of parameters and the set of previous poses of the target. In some implementations, the second set of torque values is different from the first set of torque values. In some implementations, the method includes triggering a movement of the target in accordance with the first set of torque values or the second set of torque values. In some implementations, the movement is within a similarity threshold of the target motion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Traditional motion controllers tend to provide torque values for a dedicated motion. For example, a motion controller for walking may provide torque values for a walking motion. Similarly, a motion controller for jumping may provide torque values for a jumping motion. Separately training motion controllers for different motions is resource-intensive (e.g., time-consuming). Additionally, transitions between motions are not smooth because the motion controllers generate torque values for their respective motions and not for transitioning to another motion. Furthermore, traditional motion controllers tend to be object-specific. For example, a walking motion controller for a human character generates torque values for a walking motion for the human character. The walking motion controller for the human character generally does not generate torque values for a walking motion for a dog character. The dog character generally requires a separate walking motion controller to generate torque values for the walking motion for the dog character. As such, each type of object tends to require its own set of motion controllers. Training sets of motion controllers for different types of objects tends to be resource-intensive (e.g., time-consuming).

The present disclosure provides methods, systems, and/or devices for generating motion for various different types of motions and for various types of objects. Specifically, the present disclosure describes a multi-motion generator ("motion generator", hereinafter for the sake of brevity) that provides respective torque values for multiple motions. For example, the motion generator can provide torque values for a walking motion and a jumping motion. Having a single motion generator that provides torque values for multiple motions reduces the need to train multiple single-motion generators. Additionally, the motion generator can provide torque values that allow an object to smoothly transition from one motion to another. For example, the motion generator can interpolate between the torque values at the end of the first motion and torque values at the beginning of the second motion to generate transitional torque values. Furthermore, the motion generator provides torque values for multiple types of objects. For example, the same motion generator can provide torque values for a walking motion for a human character and a virtual dog. Generating torque values for multiple types of objects reduces the need to train a walking motion generator for the human character and a separate walking motion generator for a virtual dog.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a multi-motion generator 200 ("motion generator 200", hereinafter for the sake of brevity). In some implementations, the electronic device 100 includes a handheld computing device that can be held by a user (not shown). For example, in some implementations, the electronic device 100 includes a smartphone, a tablet, a media player, a laptop, or the like. In some implementations, the electronic device 100 includes a wearable computing device that can be worn by the user. For example, in some implementations, the electronic device 100 includes a head-mountable device (HMD) that can be worn around a head of the user, an electronic watch or a pair of headphones.

Figure 6A:
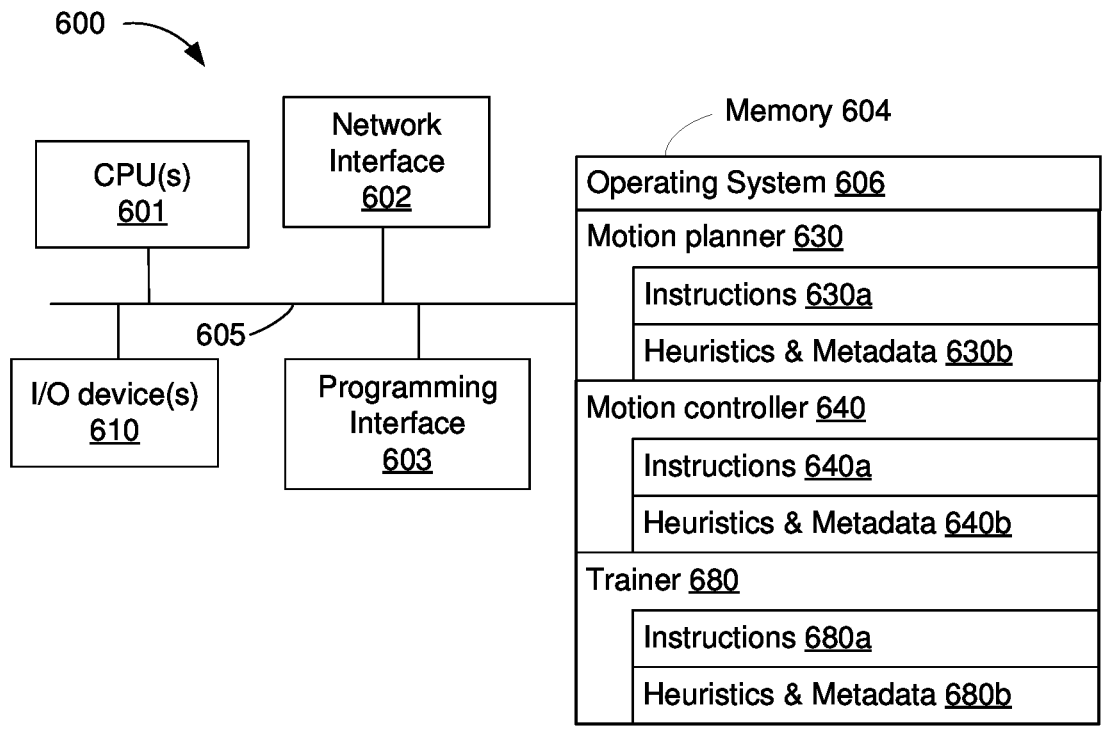
FIG. 6A is a block diagram of a device that implements the motion generator in accordance with some implementations.
Figure 6B:
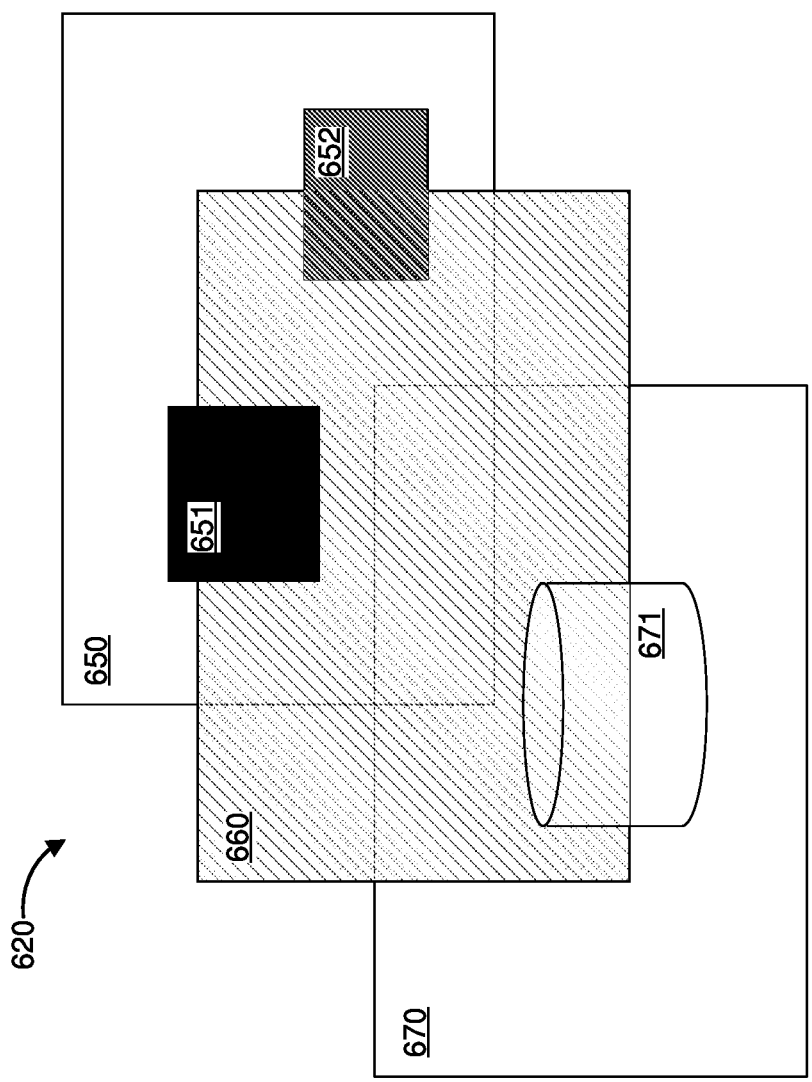
FIG. 6B is a blow-up view of an optical see-through display in accordance with some implementations.

In some implementations, the electronic device 100 includes an optical see-through display (e.g., the optical see-through display 620 shown in FIG. 6B). For example, the electronic device 100 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

In various implementations, the electronic device 100 presents (e.g., displays) an extended reality (XR) environment 102. In some implementations, the XR environment 102 includes various XR objects. In the example of FIG. 1A, the XR environment 102 includes a virtual person 104 and a virtual dog 108. In some implementations, the virtual person 104 is referred to as an XR person, an XR representation of a person, an XR representation of a human character, or an XR humanoid. Similarly, in some implementations, the virtual dog 108 is referred to as an XR dog, an XR representation of a dog, or an XR representation of a dog character.

In various implementations, the virtual person 104 includes various virtual joints 106 that connect different body portions of the virtual person 104. For example, the virtual person 104 includes a virtual neck joint 106a, a virtual left elbow joint 106b, a virtual right elbow joint 106c, a virtual hip joint 106d, a virtual left knee joint 106e, and a virtual right knee joint 106f. The virtual person 104 may include additional virtual joints that are not shown in FIG. 1A. In some implementations, the virtual joints 106 are within a similarity threshold of physical joints of a real-world person.

In various implementations, the virtual dog 108 includes various virtual dog joints 110. In some implementations, the virtual dog joints 110 are within a similarity threshold of physical joints of a real-world dog. For example, the virtual dog joints 110 include a dog shoulder joint, dog elbow joints, dog carpus joints, dog knee joints, dog hip joint, and dog vertebrae joints.

In various implementations, the motion generator 200 generates motions for the virtual objects in the XR environment 102. For example, in some implementations, the motion generator 200 generates motions for the virtual person 104 and the virtual dog 108. In some implementations, the motion generator 200 generates motions for the virtual objects in the XR environment 102 by generating torque values 242 for virtual joints of the virtual objects. For example, the motion generator 200 generates the torque values 242 for the virtual joints 106 of the virtual person 104 and/or for the virtual dog joints 110 of the virtual dog 108.

In some implementations, the motion generator 200 includes a motion planner 220 and a motion controller 240. In some implementations, the motion planner 220 generates a motion plan for a motion. In some implementations, the motion plan includes a sequence of target poses. In some implementations, the motion controller 240 generates the torque values 242 based on the motion plan that the motion planner 220 generates. For example, the motion controller 240 generates the torque values 242 based on the sequence of target poses that the motion planner 220 generates.

In various implementations, the electronic device 100 triggers the virtual person 104 to exhibit a motion corresponding to the torque values 242 by applying the torque values 242 to the virtual joints 106 of the virtual person 104. For example, if the torque values 242 are for a walking motion for the virtual person 104, the electronic device 100 triggers the virtual person 104 to exhibit the walking motion by applying the torque values 242 to the virtual joints 106 of the virtual person 104. In some implementations, the electronic device 100 animates the virtual person 104 to exhibit the motion corresponding to the torque values 242 by moving the virtual joints 106 of the virtual person 104 in accordance with the torque values 242. For example, the electronic device 100 rotates and/or translates the virtual joints 106 of the virtual person 104 according to the torque values 242.

In the example of FIG. 1A, the motion generator 200 is integrated into the electronic device 100. For example, the electronic device 100 implements or includes the motion generator 200. However, in some implementations, the motion generator 200 is separate from the electronic device 100. For example, in some implementations, the motion generator 200 resides at or is implemented by another device (e.g., by a remote server).

Figure 1B:
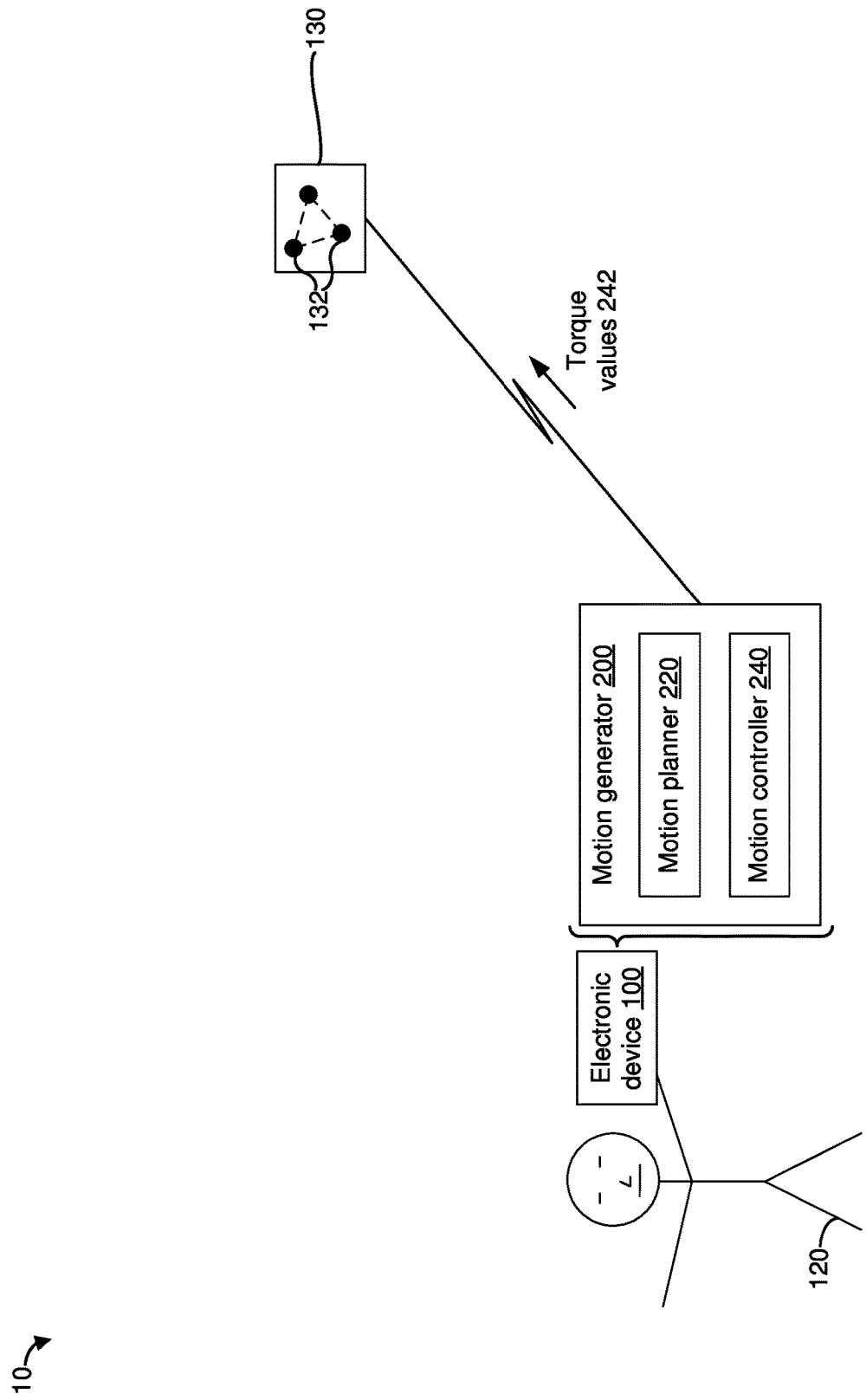

In some implementations, the electronic device 100 includes an HMD that is worn by a user (e.g., the user 120 shown in FIG. 1B). In some implementations, the HMD presents (e.g., displays) the XR environment 102. In such implementations, the HMD displays a movement of the virtual person 104 and/or the virtual dog 108 in accordance with the torque values 242. In some implementations, the HMD includes an integrated display (e.g., a built-in display, for example, a built-in optical see-through display or a built-in opaque display) that displays the XR environment 102. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the XR environment 102. In various implementations, examples of the electronic device 100 include smartphones, tablets, media players, laptops, etc.

In the example of FIG. 1B, the operating environment 10 includes a physical robot 130 with physical joints 132. In some implementations, the motion generator 200 generates the torque values 242 for the physical joints 132 of the physical robot 130. In the example of FIG. 1B, the electronic device 100 (e.g., the motion generator 200, for example, the motion controller 240) transmits the torque values 242 to the physical robot 130. In some implementations, the physical robot 130 includes motion actuators (e.g., hydraulic actuators, pneumatic actuators, and/or electric actuators such as electric motors) that apply the torque values 242 to the physical joints 132 of the physical robot 130 in order to exhibit the motion corresponding to the torque values 242. In various implementations, the motion generator 200 generates the torque values 242 for physical objects (e.g., real-world objects) with moving parts that can be moved in accordance with the torque values 242.

Figure 2A:
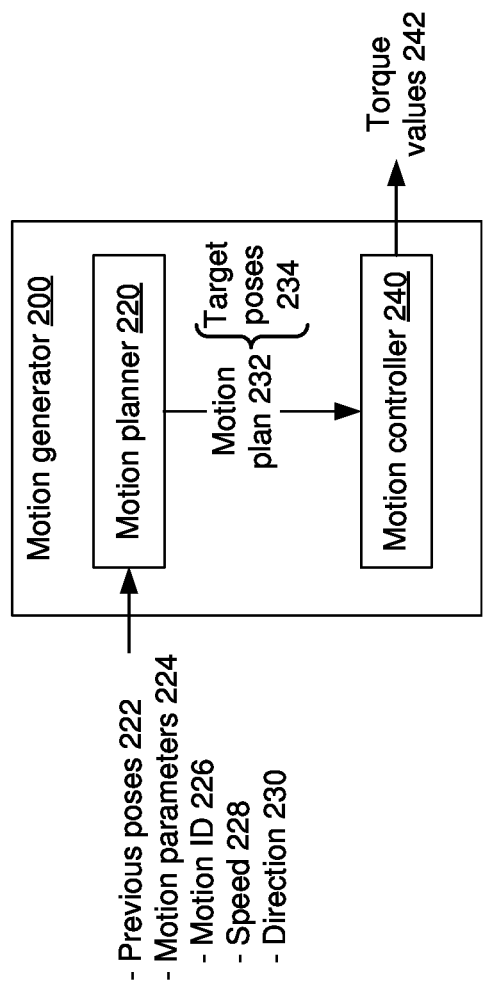
FIG. 2A is a block diagram of a motion generator in accordance with some implementations.

FIG. 2A is a block diagram of the motion generator 200 in accordance with some implementations. As described herein, in some implementations, the motion generator 200 resides at (e.g., is implemented by) the electronic device 100 shown in FIGS. 1A-1B. In some implementations, the electronic device 100 (shown in FIGS. 1A-1B) includes the motion generator 200. In various implementations, the motion generator 200 includes the motion planner 220 and the motion controller 240.

In various implementations, the motion generator 200 obtains a set of previous poses 222 for a target for which the motion generator 200 is generating the torque values 242. For example, in some implementations, the motion generator 200 receives the set of previous poses 222 for the virtual person 104 or the virtual dog shown in FIG. 1A, or the physical robot 130 shown in FIG. 1B. In some implementations, the set of previous poses 222 indicate previous joint positions and/or joint orientations of the target. For example, the set of previous poses 222 indicate positions and/or orientations of the virtual joints 106 of the virtual person 104.

In various implementations, the motion generator 200 obtains a set of one or more motion parameters 224 ("motion parameters 224", hereinafter for the sake of brevity). In some implementations, the motion parameters 224 are associated with a target motion for a target (e.g., the virtual person 104 or the virtual dog shown in FIG. 1A, or the physical robot 130 shown in FIG. 1B). In some implementations, the motion parameters 224 identify the target motion via a motion identifier (ID) 226. For example, in some implementations, the motion ID 226 refers to a walking motion. In some implementations, the motion parameters 224 identify implementation parameters that indicate how the target motion is to be performed. In the example of FIG. 2A, the motion parameters 224 include a speed 228 and a direction 230 for the walking motion. In various implementations, the motion parameters 224 are specific to the type of the target motion. For example, if the target motion is a jumping motion, then the motion parameters 224 may indicate a jump height.

In various implementations, the motion planner 220 generates a motion plan 232 for the target motion indicated by the motion ID 226. In some implementations, the motion plan 232 includes a set of one or more target poses 234 ("target poses 234", hereinafter for the sake of brevity) for the target. In some implementations, the target poses 234 include a set of target positions and/or orientations for joints of the target. For example, if the target motion is a walking motion for the virtual person 104 shown in FIG. 1A, the target poses 234 may include a set of target positions and/or orientations for the virtual joints 106 of the virtual person 104. In some implementations, manipulating the target to exhibit the target poses 234 provides an appearance that the target is performing the target motion. For example, manipulating the virtual person 104 to exhibit the target poses 234 for the walking motion provides an appearance that the virtual person 104 is performing the walking motion.

In various implementations, the motion planner 220 provides the motion plan 232 (e.g., the target poses 234) to the motion controller 240. In various implementations, the motion controller 240 generates the torque values 242 based on the motion plan 232 (e.g., the target poses 234). In some implementations, the motion controller 240 generates the torque values 242 in order to allow the target to exhibit the target poses 234. For example, the motion controller 240 generates the torque values 242 such that when the torque values 242 are applied to the virtual joints 106 of the virtual person 104, the virtual person 104 exhibits the target poses 234 for the walking motion.

Figure 2B:
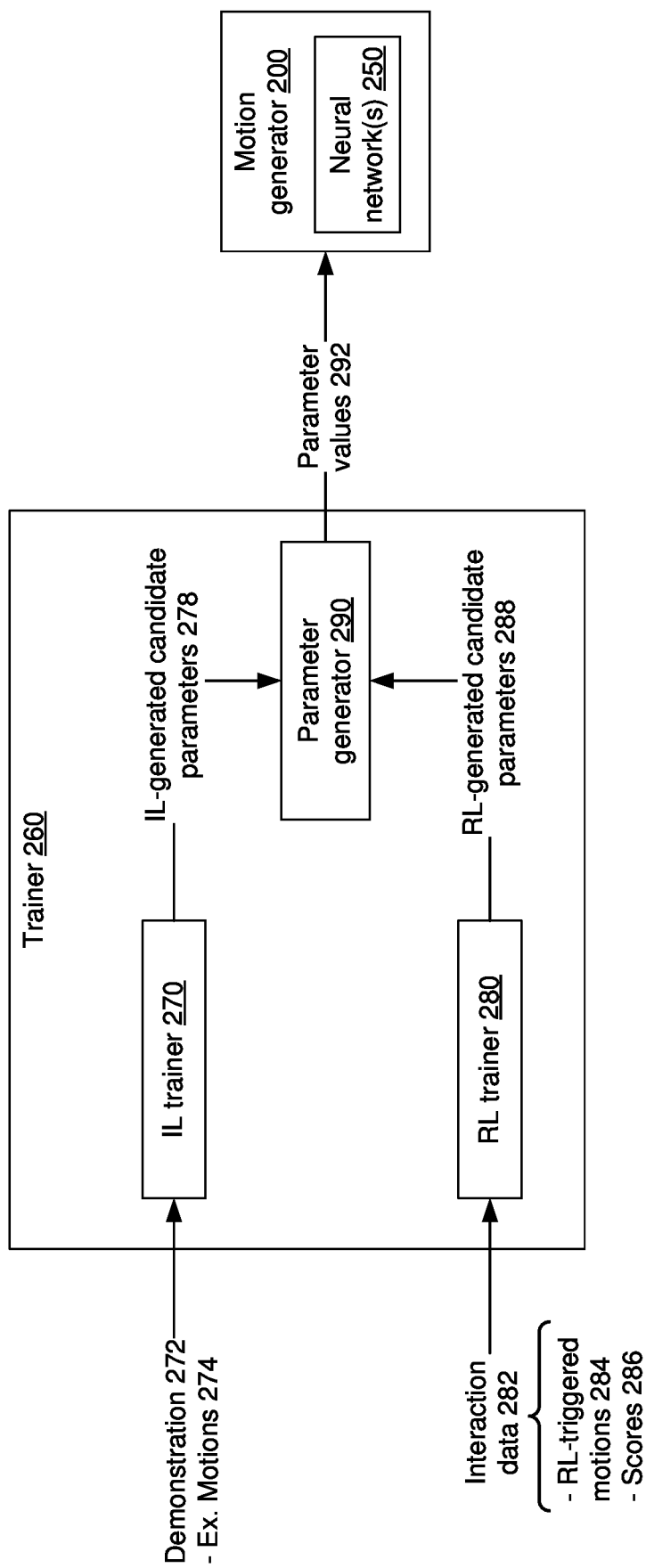
FIG. 2B is a block diagram of a trainer in accordance with some implementations.

Referring to FIG. 2B, in various implementations, the motion generator 200 includes a machine-learned model. In some implementations, the machine-learned model includes a neural network system. In some implementations, the neural network system includes a set of one or more neural networks 250. In some implementations, the motion planner 220 includes a first machine-learned model (e.g., a first neural network system that includes a first set of one or more neural networks) that generates the motion plan 232 (e.g., the target poses 234). For example, in some implementations, the first machine-learned model receives the previous poses 222 and the motion parameters 224 as inputs, and outputs the motion plan 232 including the target poses 234. In various implementations, the motion controller 240 includes a second machine-learned model (e.g., a second neural network system that includes a second set of one or more neural networks) that generates the torque values 242. For example, in some implementations, the second machine-learned model receives the motion plan 232 (e.g., the target poses 234) as an input, and outputs the torque values 242. Alternatively, in some implementations, the motion generator 200 includes a single machine-learned model that receives the previous poses 222 and the motion parameters 224 as inputs, and outputs the torque values 242.

FIG. 2B illustrates a block diagram of a trainer 260 for training the motion generator 200. In various implementations, the trainer 260 trains the motion generator 200 by concurrently utilizing multiple types of training. For example, in some implementations, the trainer 260 trains the motion generator 200 by concurrently utilizing imitation learning (IL) and reinforcement training (RL). To that effect, in various implementations, the trainer 260 includes an IL trainer 270, an RL trainer 280 and a parameter generator 290.

In various implementations, the IL trainer 270 obtains a video demonstration 272 that includes example motions 274 being performed by a model subject. For example, in some implementations, the video demonstration 272 may include an example walking motion being performed by a human being. In some implementations, the video demonstration 272 may include an example running motion being performed by a physical dog (e.g., a real-world dog). In various implementations, the IL trainer 270 generates a first set of candidate parameters 278 ("IL-generated candidate parameters 278", hereinafter for the sake of brevity) for the motion generator 200 based on the example motions 274.

In some implementations, the IL trainer 270 determines estimated torque values associated with the example motions 274. In such implementations, the IL trainer 270 sets the IL-generated candidate parameters 278 such that, if the motion generator 200 is configured with the IL-generated candidate parameters 278, the motion generator 200 generates torque values that are within a similarity threshold of the estimated torque values associated with the example motions 274. In various implementations, the IL trainer 270 provides the IL-generated candidate parameters 278 to the parameter generator 290.

In various implementations, the RL trainer 280 obtains interaction data 282 that indicates RL-triggered motions 284 of the target. In some implementations, the RL trainer 280 assesses the RL-triggered motions 284 of the target and generates scores 286 that indicate whether the RL-triggered motions 284 are within an acceptability threshold. For example, in some implementations, the scores 286 indicate whether the RL-triggered motions 284 are within a similarity threshold of the example motions 274. In various implementations, the RL trainer 280 generates a second set of candidate parameters 288 ("RL-triggered candidate parameters 288", for the sake of brevity) based on the interaction data 282.

In some implementations, the RL-triggered motions 284 are generated by configuring the motion generator 200 with a previous version of the RL-generated candidate parameters 288. In such implementations, the RL trainer 280 modifies the RL-generated candidate parameters 288 based on the scores 286 of the RL-triggered motions 284. For example, the RL trainer 280 modifies the RL-generated candidate parameters 288 so that a next set of RL-triggered motions 284 are similar to the example motions 274. In some implementations, the RL trainer 280 iteratively generates the RL-generated candidate parameters 288 until the scores 286 indicate that the RL-triggered motions 284 are within the acceptability threshold. For example, the RL trainer 280 iteratively generates the RL-generated candidate parameters 288 until the scores 286 indicate that the RL-triggered motions 284 are similar to the example motions 274. In various implementations, the RL trainer 280 provides the RL-generated candidate parameters 288 to the parameter generator 290.

In various implementations, the parameter generator 290 generates runtime parameter values 292 ("parameter values 292", hereinafter for the sake of brevity) for the motion generator 200 based on a combination of the IL-generated candidate parameters 278 and the RL-generated candidate parameters 288. In some implementations, the parameter values 292 include values for neural network weights of the neural network(s) 250.

In some implementations, the parameter generator 290 determines a loss function that is a combination of an IL loss and an RL loss. In such implementations, the parameter values 292 are based on the loss function. In some implementations, the loss function is defined by:

if $s_t \in D^d, \pi_\theta \approx \pi_E$ IL Loss: $D_{KL}[\pi_\theta(a|s) \| P(a)]$ Demo:
$P(a) = N(a^d, \sigma_d)$ if $s_t \notin D^d, s_{t \to \infty} \to D^d$ RL Loss: $-E[\log P(X|a)]$ Reward:
$r_t = -(s_{t+1}^d - s_{t+1})^2$ Maximize evidence lower bound(ELBO) $\log P(X) \geq E$
$[\log P(X|a)] - D_{KL}[\pi_\theta(a|s) \| P(a)]$ In various implementations, the loss function allows the parameter generator 290 to concurrently train the motion generator 200 based on the IL training and the RL training. Concurrently training the motion generator 200 on two different types of training is less resource-intensive than training the motion generator 200 on two different types of training sequentially. For example, concurrently training the motion generator 200 based on IL training and RL training is faster than sequentially training the motion generator 200 first on IL training and then on RL training, or vice versa.

In some implementations, the parameter generator 290 assigns respective weights to the IL training and the RL training. In some implementations, the weight for the IL training is a function of a characteristic of the video demonstration 272. For example, if a number of example motions 274 in the video demonstration 272 is below a threshold, the parameter generator 290 assigns a lower weight to the IL training than the RL training. In some implementations, the weight for the RL training is a function of a characteristic of the interaction data 282. For example, if an amount of the interaction data 282 is less than a threshold amount, the parameter generator 290 assigns a lower weight to the RL training than the IL training.

Figure 3:
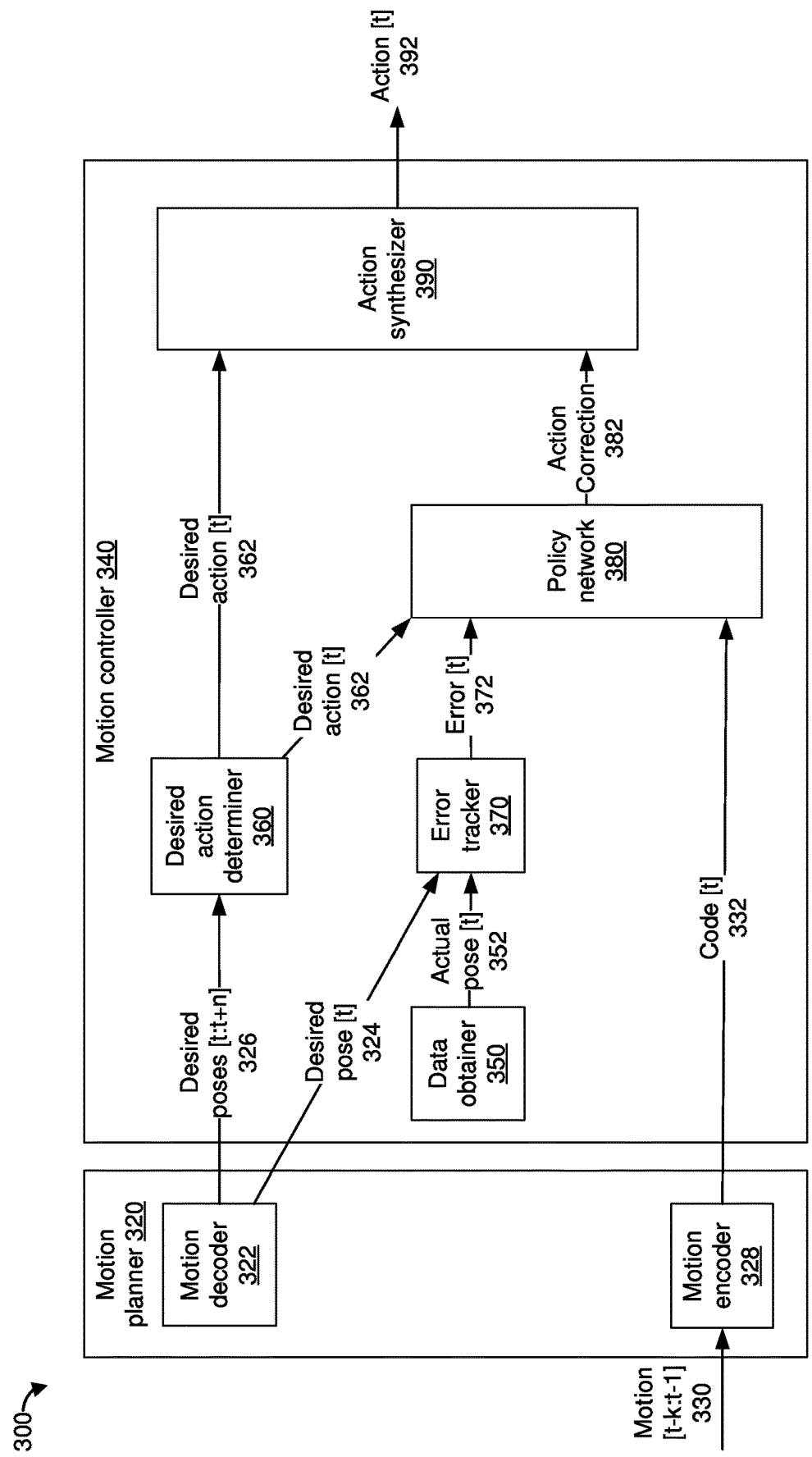
FIG. 3 is a block diagram of another motion generator in accordance with some implementation.

FIG. 3 illustrates a block diagram of a motion generator 300 in accordance with some implementations. In some implementations, the motion generator 300 implements the motion generator 200 shown in FIGS. 1A-2B. In some implementations, the motion generator 300 includes a motion planner 320 (e.g., the motion planner 220 shown in FIGS. 1A-2A) and a motion controller 340 (e.g., the motion controller 240 shown in FIGS. 1A-2A).

In various implementations, the motion planner 320 includes a motion decoder 322 and a motion encoder 328. In some implementations, the motion decoder 322 generates a desired pose 324 (e.g., a set of one or more target poses, for example, the target poses 234 shown in FIG. 2A) for a particular time. In some implementations, the desired pose 324 is for a current time. In some implementations, the desired pose 324 for an upcoming time interval (e.g., for a next time step). In some implementations, the motion decoder 322 generates future desired poses 326 for subsequent times (e.g., for time intervals that occur after the time interval corresponding to the desired pose 324).

In some implementations, the motion encoder 328 obtains past motion data 330 (e.g., the previous poses 222 shown in FIG. 2A). In some implementations, the motion encoder 328 utilizes the past motion data 330 to generate a set of computer-executable instructions 332 ("code 332", hereinafter for the sake of brevity) for providing a target motion (e.g., the target motion indicated by the motion parameters 224 shown in FIG. 2A).

In various implementations, the motion controller 340 includes a data obtainer 350, a desired action determiner 360, an error tracker 370, a policy network 380 and an action synthesizer 390. In some implementations, the data obtainer 350 obtains an actual pose 352 of the target at a particular time.

In some implementations, the desired action determiner 360 determines a desired action 362 (e.g., a target motion) for the target based on the future desired poses 326. In some implementations, the desired action determiner 360 provides the desired action 362 to the policy network 380 and the action synthesizer 390.

In some implementations, the error tracker 370 determines an error 372 based on the actual pose 352 and the desired pose 324. In some implementations, the error 372 indicates a difference between the actual pose 352 and the desired pose 324. The error tracker 370 indicates the error 372 to the policy network 380.

In various implementations, the policy network 380 determines an action correction 382 based on the error 372 and the desired action 362. In some implementations, the action correction 382 compensates for the difference between the actual pose 352 and the desired pose 324 in order to reduce a magnitude of the error 372. For example, in some implementations, if a walking motion results in feet of the virtual person 104 penetrating a floor surface of the XR environment 102 (shown in FIG. 1A), the action correction 382 is to walk on an incline in order to reduce the penetration of the feet into the floor surface of the XR environment 102.

In various implementations, the action synthesizer 390 synthesizes the action 392 based on the desired action 362 and the action correction 382. In some implementations, the action 392 is a modification of the desired action 362 in order to reduce the error 372. For example, if the desired action 362 is to walk on a flat surface and the error 372 is that the feet are penetrating the floor surface of the XR environment 102, then the action 392 may be to walk on an incline surface in order to reduce the penetration of the feet into the floor surface of the XR environment 102. In some implementations, the action 392 is represented by a set of torque values (e.g., the torque values 242 shown in FIGS. 1A-2A).

Figure 4A:
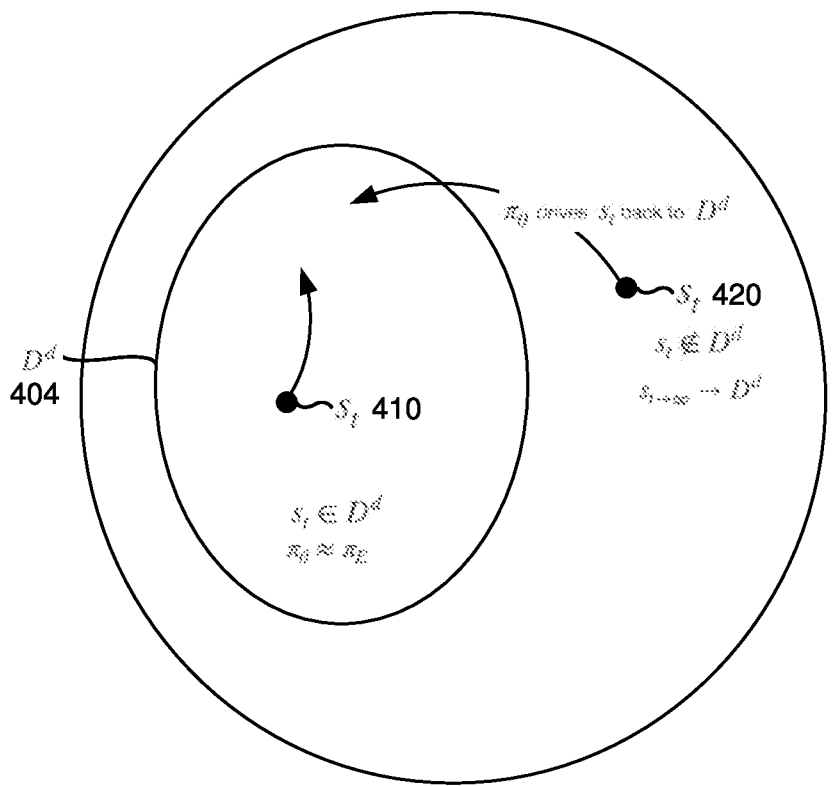
FIGS. 4A-4B are diagrams illustrating operations associated with motion generator in accordance with some implementations.

In the example of FIG. 4A, $D^d$ 404 represents a demonstration (e.g., the video demonstration 272 shown in FIG. 2B), $s_t$ 410 represents a first set of torque values and $s_t$ 420 represents a second set of torque values. As illustrated in FIG. 4A, $s_t$ 410 is within $D^d$ 404 and a selected policy $\pi_\theta$ (e.g., the policy network 380 shown in FIG. 3) is approximately equal to an unknown expert policy $\pi_E$. As further illustrated in FIG. 4A, $s_t$ 420 is outside $D^d$ 404. However, the selected policy no drives $s_t$ 420 back to $D^d$ 404 as time progresses.

Figure 4B:
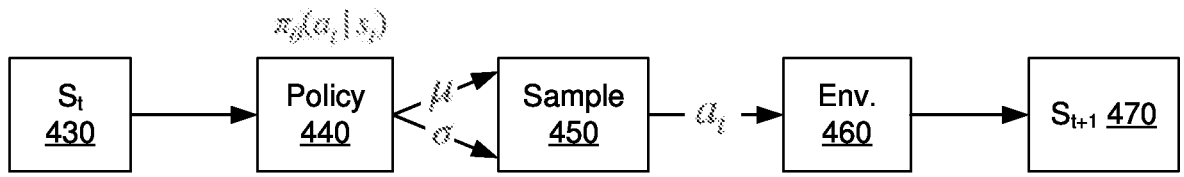

Referring to FIG. 4B, $s_t$ 430 (e.g., a first set of torque values for a first time period) is provided to a policy 440 (e.g., the policy network 380 shown in FIG. 3). Based on the policy 440 (e.g., a mean μ and/or a variance σ), a sample 450

(e.g., the example motions 274 shown in FIG. 2B) and environmental data 460 (e.g., the interaction data 282 shown in FIG. 2B), $s_{t+1}$ 470 (e.g., a second set of torque values for a second time period) is generated. In some implementations, the policy 440 is implemented by the motion controller 240 shown in FIGS. 1A-2A.

Figure 5A:
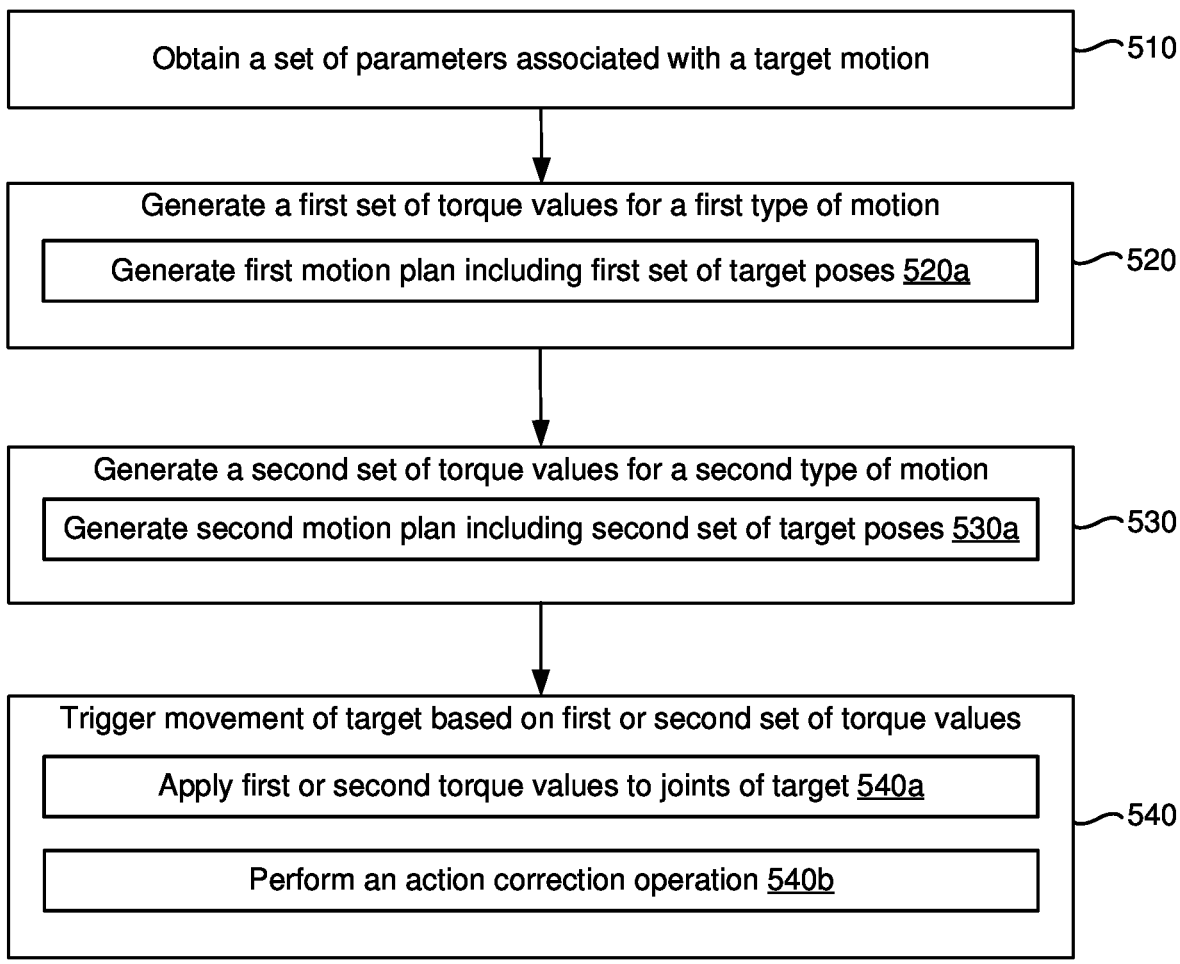
FIG. 5A is a flowchart representation of a method of providing motion for a target in accordance with some implementations.

FIG. 5A is a flowchart representation of a method 500 of providing motion for a target. In various implementations, the method 500 is performed by a device including a non-transitory memory and one or more processors coupled with the non-transitory memory (e.g., the electronic device 100 shown in FIGS. 1A-1B, the motion generator 200 shown in FIGS. 1A-2B and/or the motion generator 300 shown in FIG. 3). In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 510, in some implementations, the method 500 includes obtaining, by a motion generator that has been trained to generate torque values for a plurality of joints of a rig (e.g., skeleton) associated with a target, a set of parameters associated with a target motion (e.g., a desired motion) for the target. For example, as shown in FIG. 2A, the motion generator 200 obtains the motion parameters 224 for a target motion for a target (e.g., the virtual person 104 shown in FIG. 1A, the virtual dog shown in FIG. 1A or the physical robot 130 shown in FIG. 1B).

As represented by block 520, in some implementations, the method 500 includes, in response to the target motion being a first type of motion, generating, by the motion generator, a first set of torque values for the plurality of joints based on the set of parameters and a set of previous poses of the target. For example, if the target motion is a walking motion, the motion generator generates a first set of torque values that, when applied to joints of the target, provide an appearance that the target is walking.

As represented by block 520a, in some implementations, generating the first set of torque values includes determining, by a motion planner, a first motion plan for the target based on the set of parameters and the set of previous poses. The method 500 includes generating, by a motion controller, the first set of torque values based on the first motion plan. For example, as shown in FIG. 2A, the motion planner 220 generates the motion plan 232 based on the motion parameters 224 and the motion controller 240 generates the torque values 242 based on the motion plan 232.

In some implementations, determining the first motion plan includes determining a first sequence of target poses for the target based on the set of parameters and the set of previous poses. In such implementations, determining the first set of torque values comprises determining the first set of torque values based on the first sequence of target poses. For example, as shown in FIG. 2A, the motion plan 232 includes the target poses 234, and the motion controller 240 determines the torque values 242 based on the target poses 234.

As represented by block 530, in some implementations, the method 500 includes, in response to the target motion being a second type of motion that is different from the first type of motion, generating, by the motion generator, a second set of torque values for the plurality of joints based on the set of parameters and the set of previous poses of the target. The second set of torque values is different from the first set of torque values. For example, if the target motion is a jumping motion, the motion generator generates a second set of torque values that, when applied to joints of the target, provide an appearance that the target is jumping.

As represented by block 530a, in some implementations, generating the second set of torque values includes determining, by the motion planner, a second motion plan for the target based on the set of parameters and the set of previous poses. In some implementations, the method includes generating, by the motion controller, the second set of torque values based on the second motion plan.

In some implementations, determining the second motion plan includes determining a second sequence of target poses for the target based on the set of parameters and the set of previous poses. In such implementations, determining the second set of torque values comprises determining the second set of torque values based on the second sequence of target poses.

As represented by block 540, in some implementations, the method 500 includes triggering a movement of the target in accordance with the first set of torque values or the second set of torque values. In some implementations, the movement is within a similarity threshold of the target motion. For example, as described in relation to FIG. 1A, the electronic device 100 (e.g., the motion generator 200) animates the virtual person 104 and/or the virtual dog 108 in accordance with the torque values 242. As another example, as shown in FIG. 1B, the electronic device 100 transmits the torque values 242 to the physical robot 130.

As represented by block 540a, in some implementations, triggering the movement comprises displaying the movement of the target by applying the first set of torque values or the second set of torque values to the plurality of joints of the target.

In some implementations, the target includes a virtual object (e.g., the virtual person 104 or the virtual dog 108 shown in FIG. 1) and the plurality of joints includes virtual joints of the virtual object (e.g., the virtual joints 106 of the virtual person 104 or the virtual dog joints 110 of the virtual dog 108). In such implementations, triggering the movement includes providing the first set of torque values or the second set of torque values to a display and rendering pipeline for the target.

In some implementations, the target includes a physical element (e.g., a real-world object, for example, the physical robot 130 shown in FIG. 1B) and the plurality of joints includes physical joints of the physical element (e.g., the physical joints 132 of the physical robot 130). In such implementations, triggering the movement includes providing the first set of torque values or the second set of torque values to a set of motion actuators (e.g., to a set of motors that cause the movement of the physical object).

As represented by block 540b, in some implementations, the method 500 includes monitoring the movement of the target in order to determine whether the movement satisfies the target motion. The method 500 includes adjusting the first set of torque values or the second set of torque values in response to determining that the movement breaches the target motion. For example, as shown in FIG. 3, the motion generator 300 determines the action correction 382 based on the error 372 (e.g., a difference between the actual pose 352 and the desired action 362).

In some implementations, monitoring the movement of the target includes monitoring an interaction of the target with another object in an environment of the target. For example, in some implementations, the motion generator 200 and/or the motion generator 300 monitors how feet of the virtual person 104 interact with a floor surface of the XR environment 102.

In some implementations, adjusting the first set of torque values or the second set of torque values includes replacing the first set of torque values or the second set of torque values with a third set of torque values that corresponds to a third type of motion that compensates for the breach. For example, as shown in FIG. 3, the motion generator 300 generates the action correction 382 in order to reduce the error 372. For example, if the walking motion results in toes of the virtual person 104 penetrating the floor surface of the XR environment 102, then the action correction 382 includes generating torque values for an inclined walking motion in order to avoid the toes penetrating the floor.

In some implementations, the target motion includes performing the first type of motion and the second type of motion in sequence. In such implementations, the method includes generating a third set of torque values that corresponds to transitioning between the first type of motion and the second type of motion. In some implementations, generating the third set of torque values includes interpolating between the first set of torque values and the second set of torque values. In some implementations, generating the third set of torque values includes determining a third sequence of target poses for the target based on an end portion of the first sequence of body poses and a beginning portion of the second sequence of body poses, and generating the third set of torque values based on the third sequence of target poses.

In some implementations, the method 500 includes determining a type (e.g., an object type) of the target, generating the first set of torque values for the first type of motion in response to the type being a first type, and generating a third set of torque values for the first type of motion in response to the type being a second type. For example, the motion generator 200 generates a first set of torque values for the virtual person 104 to exhibit a walking motion, and a second set of torque values for the virtual dog 108 to exhibit the walking motion.

Figure 5B:
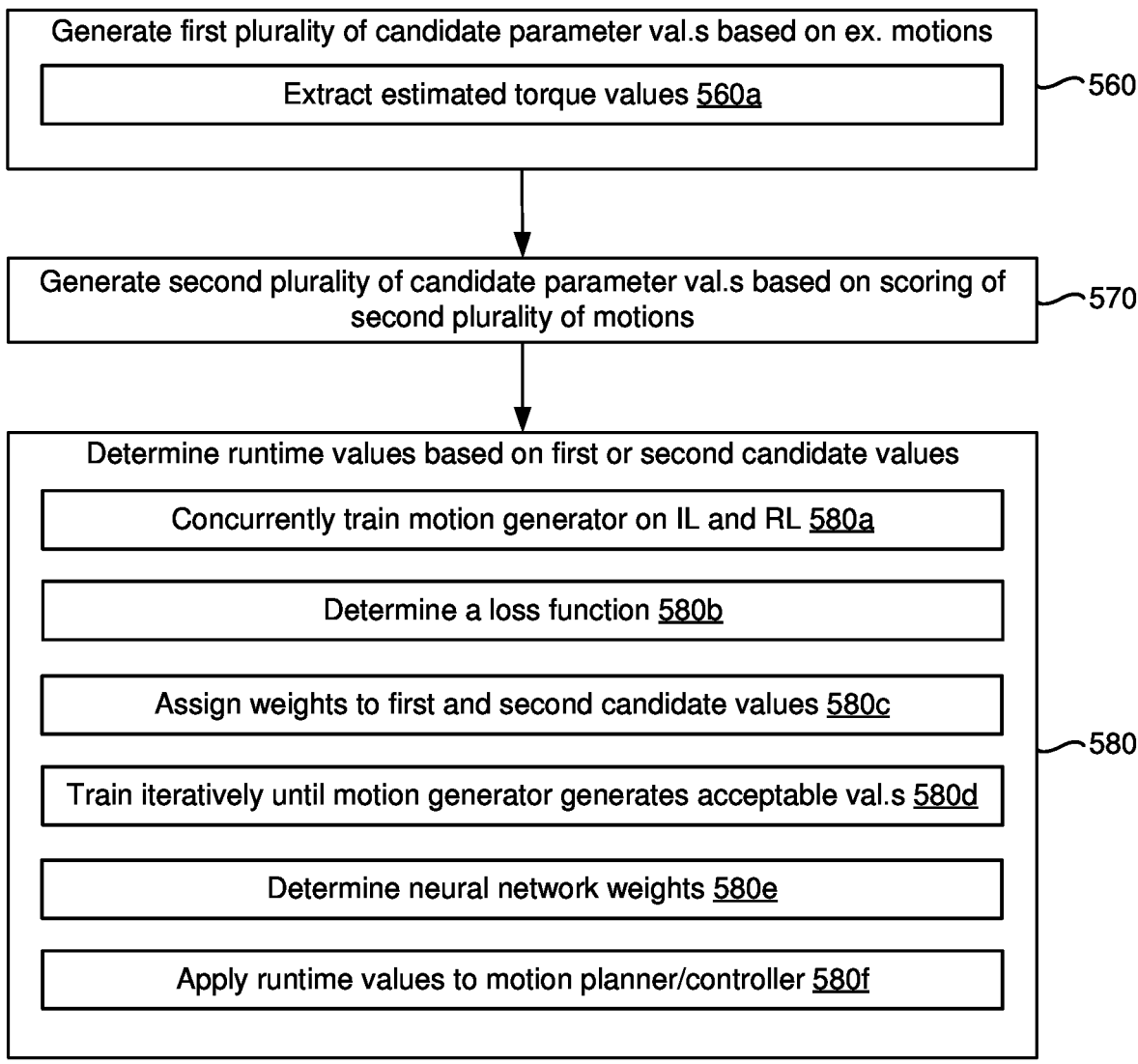
FIG. 5B is a flowchart representation of a method of training the motion generator in accordance with some implementations.

FIG. 5B is a flowchart representation of a method 550 of training a motion generator (e.g., the motion generator 200 shown in FIGS. 1A-2B and/or the motion generator 300 shown in FIG. 3).

As represented by block 560, in some implementations, the method 550 includes generating a first plurality of candidate parameter values (e.g., a first plurality of neural network weights) based on a function of a first plurality of example motions performed by one or more model subjects. For example, as shown in FIG. 2B, the IL trainer 270 generates the IL-generated candidate parameters 278 based on the example motions 274 depicted in the video demonstration 272.

As represented by block 560a, in some implementations, generating the first plurality of candidate operational values includes determining estimated torque values associated with the first plurality of example motions, and generating the first plurality of candidate operational values based on the estimated torque values. For example, the IL trainer 270 determines estimated torque values of joints of a model subject that is performing the example motions 274, and the IL trainer 270 generates the IL-generated candidate parameters 278 based on the estimated torque values.

As represented by block 570, in some implementations, the method 550 includes generating a second plurality of candidate parameter values based on a scoring of a second plurality of example motions of the rig (e.g., skeleton) associated with the target. In some implementations, the second plurality of example motions is a function of a third set of torque values applied to the plurality of joints of the rig. For example, as shown in FIG. 2B, the RL trainer 280 generates the RL-generated candidate parameters 288 based on the interaction data 282.

As represented by block 580, in some implementations, the method 550 includes determining (e.g., modifying or setting/generating anew) a plurality of runtime parameter values for the motion generator based on a combination of the first plurality of candidate parameter values and the second plurality of candidate parameter values. In some implementations, the plurality of runtime parameter values allows the movement of the target to be within the similarity threshold of the target motion. For example, as shown in FIG. 2B, the parameter generator 290 generates the parameter values 292 for the motion generator 200 based on a combination of the IL-generated candidate parameters 278 and the RL-generated candidate parameters 288.

As represented by block 580a, in some implementations, determining the plurality of runtime parameter values includes concurrently training the motion generator based on imitation learning and reinforcement learning. For example, as shown in FIG. 2B, by generating the parameter values 292 based on the IL-generated candidate parameters 278 and the RL-generated candidate parameters 288, the trainer 260 concurrently trains the motion generator 200 based on IL and RL.

As represented by block 580b, in some implementations, determining the plurality of runtime operational values includes determining a first loss function that is associated with the first plurality of example motions, a second loss function that is associated with the second plurality of example motions and a third loss function that is a combination of the first loss function and the second loss function. In such implementations, the method 550 includes determining the plurality of runtime parameter values in accordance with the third loss function.

In some implementations, determining the plurality of runtime parameter values includes determining the plurality of runtime parameter values based on a loss function that is a combination of an imitation loss function that is associated with the first plurality of example motions and a reinforcement loss function that is associated with the second plurality of example motions.

As represented by block 580c, in some implementations, determining the plurality of runtime parameter values includes assigning a first weight to the first plurality of candidate operational values based on a number of the first plurality of example motions, and assigning a second weight to the second plurality of candidate operational values based on a number of the second plurality of example motions. In some implementations, the first weight is proportional to the number of the first plurality of example motions, and the second weight is proportional to the number of the second plurality of example motions. For example, in some implementations, the parameter generator 290 assigns a weight to the IL-generated candidate parameters 278 based on a number of the example motions 274. In some implementations, the parameter generator 290 assigns a weight to the RL-generated candidate parameters 288 based on a number of the RL-triggered motions 284.

As represented by block 580d, in some implementations, training the motion generator includes iteratively training the motion generator until the motion generator generates torque values that are within an acceptability threshold of estimated torque values associated with the first plurality of example motions. For example, in some implementations, the trainer 260 iteratively trains the motion generator 200 until the torque values 242 generated by the motion generator 200 satisfy an acceptability threshold (e.g., until the torque values 242 are similar to estimated torque values associated with the example motions 274).

As represented by block 580e, in some implementations, determining the plurality of runtime parameter values includes determining values for weights of a neural network. For example, as shown in FIG. 2B, the parameter values 292 are values for weights of the neural network(s) 250.

As represented by block 580f, in some implementations, the motion generator includes a motion planner that generates motion plans and a motion controller that generates torque values for joints. In such implementations, training the motion generator includes applying the runtime parameter values to the motion planner or the motion controller. For example, in some implementations, the parameter values 292 are distributed across the motion planner 220 and the motion controller 240.

FIG. 6A is a block diagram of a device 600 that implements a motion generator. In some implementations, the device 600 implements the motion generator 200 shown in FIGS. 1A-2B, and/or the motion generator 300 shown in FIG. 3. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units (CPUs) 601, a network interface 602, a programming interface 603, a memory 604, one or more input/output (I/O) devices 610, and one or more communication buses 605 for interconnecting these and various other components.

In some implementations, the network interface 602 is provided to, among other uses, establish and maintain a metadata tunnel between a cloud hosted network management system and at least one private network including one or more compliant devices. In some implementations, the one or more communication buses 605 include circuitry that interconnects and controls communications between system components. The memory 604 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 604 optionally includes one or more storage devices remotely located from the one or more CPUs 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, a motion planner 630, a motion controller 640 and a trainer 680. In various implementations, the device 600 performs the methods 500 and 550 shown in FIGS. 5A and 5B, respectively.

In some implementations, the motion planner 630 generates a motion plan for a target motion for a target. In some implementations, the motion planner 630 performs substantially the same operations as the motion planner 220 shown in FIGS. 1A-2A and/or the motion planner 320 shown in FIG. 3. To that end, the motion planner 630 includes instructions 630a, and heuristics and metadata 630b.

In some implementations, the motion controller 640 generates torque values for a target motion for a target. In some implementations, the motion controller 640 performs substantially the same operations as the motion controller 240 shown in FIGS. 1A-2A and/or the motion controller 340 shown in FIG. 3. To that end, the motion controller 640 includes instructions 640a, and heuristics and metadata 640b.

In some implementations, the trainer 680 trains the motion planner 630 and/or the motion controller 640. In some implementations, the trainer 680 performs substantially the same operations as the trainer 260 shown in FIG. 2B. In some implementations, the trainer 680 performs the method 550 shown in FIG. 5B. To that end, the trainer 680 includes instructions 660a, and heuristics and metadata 660b.

In some implementations, the one or more I/O devices 610 include an image sensor (e.g., a camera) for capturing example motions (e.g., the example motions 274 shown in FIG. 2B). In some implementations, the one or more I/O devices 610 include a display for displaying an XR environment (e.g., the XR environment 102 shown in FIG. 1A).

In various implementations, the one or more I/O devices 610 include a video pass-through display which displays at least a portion of a physical environment surrounding the device 600 as an image captured by a scene camera. In various implementations, the one or more I/O devices 610 include an optical see-through display which is at least partially transparent and passes light emitted by or reflected off the physical environment.

FIG. 6B illustrates a blow-up view of an optical see-through display 620 in accordance with some implementations. In various implementations, the optical see-through display 620 includes a selectively occlusive layer 650 that includes a number of pixel elements that, when activated, block light from passing through the optical see-through display 620. Thus, through appropriate addressing of the selectively occlusive layer 650, the optical see-through display 620 can render a black region 651 or a gray region 652. In various implementations, the optical see-through display 620 includes a globally dimmable layer 660 that, according to a controllable dimming level, dims light passing through the optical see-through display 620. In various implementations, the globally dimmable layer 660 includes one or more of a photochromic element, electrochromic element, an SPD (suspended-particle device) element, GHLC (guest-host liquid crystal) element, or PDLC (polymer-dispersed liquid-crystal) element. In various implementations, the optical see-through display 620 includes a light addition layer 670 that includes a number of pixel elements that, when activated, emit light towards the user. Thus, through appropriate addressing of the light addition layer 670, the optical see-through display 620 can render a white (or colored) virtual object 671. In various implementations, the optical see-through display 620 does not include each of the layers 650, 660, 670. In particular, in various implementations, the optical see-through display 620 does not include the selectively occlusive layer 650 and/or the globally dimmable layer 660. In various implementations, the optical see-through display 620 does not include the light addition layer 670 and/or the globally dimmable layer 660. In various implementations, the optical see-through display 620 does not include the selectively occlusive layer 650 and/or the light addition layer 670.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        obtaining, by a motion generator that has been trained to generate torque values for a plurality of joints of a rig associated with a target, a set of parameters associated with a target motion for the target;
        in response to the target motion being a first type of motion, generating, by the motion generator, a first set of torque values for the plurality of joints based on the set of parameters and a set of previous poses of the target;
        in response to the target motion being a second type of motion that is different from the first type of motion, generating, by the motion generator, a second set of torque values for the plurality of joints based on the set of parameters and the set of previous poses of the target, wherein the second set of torque values is different from the first set of torque values; and
        triggering a movement of the target in accordance with the first set of torque values or the second set of torque values, wherein the movement is within a similarity threshold of the target motion.

2. The method of claim 1, wherein generating the first set of torque values comprises:
    determining, by a motion planner, a first motion plan for the target based on the set of parameters and the set of previous poses; and
    generating, by a motion controller, the first set of torque values based on the first motion plan.

3. The method of claim 2, wherein determining the first motion plan comprises determining a first sequence of target poses for the target based on the set of parameters and the set of previous poses; and
    wherein determining the first set of torque values comprises determining the first set of torque values based on the first sequence of target poses.

4. The method of claim 2, wherein generating the second set of torque values comprises:
    determining, by the motion planner, a second motion plan for the target based on the set of parameters and the set of previous poses; and
    generating, by the motion controller, the second set of torque values based on the second motion plan.

5. The method of claim 4, wherein determining the second motion plan includes determining a second sequence of target poses for the target based on the set of parameters and the set of previous poses; and wherein determining the second set of torque values comprises determining the second set of torque values based on the second sequence of target poses.

6. The method of claim 1, wherein the target motion includes performing the first type of motion and the second type of motion in sequence, and the method further comprises:
generating a third set of torque values that corresponds to transitioning between the first type of motion and the second type of motion.

7. The method of claim 6, wherein generating the third set of torque values comprises interpolating between the first set of torque values and the second set of torque values.

8. The method of claim 6, wherein generating the third set of torque values comprises:
determining a third sequence of target poses for the target based on an end portion of the first sequence of body poses and a beginning portion of the second sequence of body poses; and
generating the third set of torque values based on the third sequence of target poses.

9. The method of claim 1, wherein triggering the movement comprises displaying the movement of the target by applying the first set of torque values or the second set of torque values to the plurality of joints of the target.

10. The method of claim 1, wherein the target includes a virtual object and the plurality of joints includes virtual joints of the virtual object; and
wherein triggering the movement comprises providing the first set of torque values or the second set of torque values to a display and rendering pipeline for the target.

11. The method of claim 1, wherein the target includes a physical element and the plurality of joints includes physical joints of the physical element; and
wherein triggering the movement comprises providing the first set of torque values or the second set of torque values to a set of motion actuators.

12. The method of claim 1, further comprising:
monitoring the movement of the target in order to determine whether the movement satisfies the target motion; and
adjusting the first set of torque values or the second set of torque values in response to determining that the movement breaches the target motion.

13. The method of claim 12, wherein the monitoring comprises monitoring an interaction of the target with another object in an environment of the target.

14. The method of claim 12, wherein adjusting the first set of torque values or the second set of torque values comprises replacing the first set of torque values or the second set of torque values with a third set of torque values that corresponds to a third type of motion that compensates for the breach.

15. The method of claim 1, further comprising:
determining a type of the target;
generating the first set of torque values for the first type of motion in response to the type being a first type; and
generating a third set of torque values for the first type of motion in response to the type being a second type.

16. The method of claim 1, further comprising training the motion generator by:
generating a first plurality of candidate parameter values based on a function of a first plurality of example motions performed by one or more model subjects;
generating a second plurality of candidate parameter values based on a scoring of a second plurality of motions of the rig associated with the target, wherein the second plurality of motions is a function of a third set of torque values applied to the plurality of joints of the rig; and
determining a plurality of runtime parameter values for the motion generator based on a combination of the first plurality of candidate parameter values and the second plurality of candidate parameter values.

17. The method of claim 16, wherein determining the plurality of runtime parameter values comprises concurrently training the motion generator based on imitation learning and reinforcement learning.

18. The method of claim 16, wherein determining the plurality of runtime operational values comprises:
determining a first loss function that is associated with the first plurality of example motions, a second loss function that is associated with the second plurality of motions and a third loss function that is a combination of the first loss function and the second loss function; and
determining the plurality of runtime parameter values in accordance with the third loss function.

19. A non-transitory memory storing one or more programs, which, when executed by one or more processors of a device, cause the device to:
obtain, by a motion generator that has been trained to generate torque values for a plurality of joints of a rig associated with a target, a set of parameters associated with a target motion for the target;
in response to the target motion being a first type of motion, generate, by the motion generator, a first set of torque values for the plurality of joints based on the set of parameters and a set of previous poses of the target;
in response to the target motion being a second type of motion that is different from the first type of motion, generate, by the motion generator, a second set of torque values for the plurality of joints based on the set of parameters and the set of previous poses of the target, wherein the second set of torque values is different from the first set of torque values; and
trigger a movement of the target in accordance with the first set of torque values or the second set of torque values, wherein the movement is within a similarity threshold of the target motion.

20. A device comprising:
one or more processors;
a non-transitory memory;
one or more displays; and
one or more programs stored in the non-transitory memory, which, when executed by the one or more processors, cause the device to:
obtain, by a motion generator that has been trained to generate torque values for a plurality of joints of a rig associated with a target, a set of parameters associated with a target motion for the target;
in response to the target motion being a first type of motion, generate, by the motion generator, a first set of torque values for the plurality of joints based on the set of parameters and a set of previous poses of the target;
in response to the target motion being a second type of motion that is different from the first type of motion, generate, by the motion generator, a second set of torque values for the plurality of joints based on the set of parameters and the set of previous poses of the target, wherein the second set of torque values is different from the first set of torque values; and trigger a movement of the target in accordance with the first set of torque values or the second set of torque values, wherein the movement is within a similarity threshold of the target motion.

\* \* \* \* \*